(12) United States Patent
Canale

(10) Patent No.: US 10,997,867 B2
(45) Date of Patent: May 4, 2021

(54) METHOD AND A SYSTEM FOR ASSISTING A ROTORCRAFT TO APPROACH AND HOVER RELATIVE TO A MOBILE TARGET

(71) Applicant: AIRBUS HELICOPTERS, Marignane (FR)

(72) Inventor: Nicolas Canale, Marseilles (FR)

(73) Assignee: AIRBUS HELICOPTERS, Marignane (FR)

(*) Notice: Subject to any disclaimer, the term of this patent is extended or adjusted under 35 U.S.C. 154(b) by 53 days.

(21) Appl. No.: 15/858,078

(22) Filed: Dec. 29, 2017

(65) Prior Publication Data
US 2018/0218621 A1    Aug. 2, 2018

(30) Foreign Application Priority Data

Jan. 27, 2017  (FR) ...................................... 1700085

(51) Int. Cl.
| | | |
|---|---|---|
| B64C 39/02 | (2006.01) | |
| G05D 1/00 | (2006.01) | |
| G05D 1/10 | (2006.01) | |
| B64C 19/00 | (2006.01) | |
| G05D 1/08 | (2006.01) | |
| G05D 1/04 | (2006.01) | |
| G01C 23/00 | (2006.01) | |

(Continued)

(52) U.S. Cl.
CPC ............. *G08G 5/025* (2013.01); *G05D 1/102* (2013.01); *G08G 5/0021* (2013.01); *G08G 5/0039* (2013.01); *G08G 5/0091* (2013.01)

(58) Field of Classification Search
None
See application file for complete search history.

(56) References Cited

U.S. PATENT DOCUMENTS

| | | | | |
|---|---|---|---|---|
| 4,029,271 A | * | 6/1977 | Murphy | G05D 1/102 244/17.13 |
| 6,522,958 B1 | * | 2/2003 | Dwyer | G01C 23/00 340/995.1 |
| 9,524,647 B2 | * | 12/2016 | Kohn-Rich | G05D 1/0646 |

(Continued)

FOREIGN PATENT DOCUMENTS

EP    0141575 A1    5/1985

OTHER PUBLICATIONS

French Search Report for French Application No. FR 1700085, Completed by the French Patent Office, dated Oct. 18, 2017, 7 pages.

*Primary Examiner* — Adam D Tissot
*Assistant Examiner* — Laura E Linhardt
(74) *Attorney, Agent, or Firm* — Brooks Kushman P.C.

(57) ABSTRACT

A method and a system for establishing an approach to hover path for a rotorcraft enabling it to approach a mobile target and to hover relative to the target. An initial approach to hover path is firstly defined from measurements of the characteristics of the respective routes of the target and of the rotorcraft and also of the wind conditions to which the rotorcraft is subjected. During the flight of the rotorcraft, a required approach to hover path is determined in real time as a function of potential variations in the characteristics of the target, of the rotorcraft, and of the wind. Thereafter, the initial path is updated by the required path where necessary in order to guarantee safety of the approach to hover path for the rotorcraft relative to the target.

20 Claims, 4 Drawing Sheets

(51) Int. Cl.
*G08G 5/02* (2006.01)
*G08G 5/00* (2006.01)

(56) References Cited

U.S. PATENT DOCUMENTS

| | | | |
|---|---|---|---|
| 9,688,404 B1* | 6/2017 | Buchmueller | B64D 1/12 |
| 2009/0043431 A1* | 2/2009 | Marze | B64C 27/001 |
| | | | 701/5 |
| 2009/0157233 A1 | 6/2009 | Kokkeby et al. | |
| 2014/0246541 A1* | 9/2014 | Feyzeau | B64C 19/00 |
| | | | 244/1 N |
| 2017/0003684 A1* | 1/2017 | Knudsen | G01N 21/51 |

* cited by examiner

# METHOD AND A SYSTEM FOR ASSISTING A ROTORCRAFT TO APPROACH AND HOVER RELATIVE TO A MOBILE TARGET

CROSS-REFERENCE TO RELATED APPLICATIONS

This application claims priority to French patent application No. FR 17 00085 filed on Jan. 27, 2017, the disclosure of which is incorporated in its entirety by reference herein.

BACKGROUND OF THE INVENTION (1) Field of the Invention

The present invention lies in the field of systems for assisting the piloting of rotorcraft, and more particularly rotorcraft that perform search and rescue operations at sea.

The present invention relates to a method of establishing an approach path for a rotorcraft to a mobile target and of enabling the rotorcraft to hover relative to the mobile target. The present invention also relates to a system for establishing an approach path and for enabling the rotorcraft to hover relative to the mobile target.

2) Description of Related Art

Rotorcraft are flying machines that differ from other powered aircraft mainly in their ability to fly both in cruising flight at high speed and also in flight at low speed or hovering. This capacity is obtained by making use of at least one rotary wing, such as a main rotor having an axis of rotation that is substantially vertical.

Nowadays, a rotorcraft generally includes an autopilot that takes the place of the pilot of the rotorcraft and that makes it possible in particular to follow a predefined flight path. The autopilot evaluates, and where necessary corrects, the progress of the rotorcraft in real time in response to a range of information supplied by the instrumentation on board the rotorcraft.

A rotorcraft also has a flight management system (FMS). When associated with the autopilot of the rotorcraft, such a flight management system enables the predetermined flight path to be defined and followed.

In the context of search and rescue operations at sea, rotorcraft are used daily to rescue vessels. With respect to such vessels, rotorcraft perform operations of winching rescue teams, and of recovering injured or shipwrecked people.

For such search and rescue operations, a rotorcraft must be able to act in complete safety and as quickly as possible in an environment that is often hostile, e.g. strong wind and poor visibility, and possibly at night. Specifically, the survival of shipwrecked people can sometimes depend on the speed with which they are rescued. In addition, such operations are sometimes performed a long way off shore. Since the flying range of rotorcraft is limited, it is therefore important to optimize the path followed by the rotorcraft in order to reach the vessel that needs rescue.

Such operations can be performed on all types of vessel, both vessels of small to medium size such as recreational boats or trawlers and vessels of very great tonnage such as container ships or ferries. Furthermore, depending on their characteristics, on the damage that has been suffered, and/or on weather conditions, such vessels are not always capable of co-operating in order to facilitate the rescue operation by stopping moving or at least by changing their route and their speed, in particular relative to the wind direction. Specifically, the rescue may involve a vessel that has stopped or that is still moving.

For such a rescue operation, the rotorcraft needs to be positioned to hover vertically above the vessel when it is stopped in order to enable the rescue operation to be performed. However, when the vessel is still moving, the rotorcraft needs to be positioned vertically above the vessel and to track the route and the speed of the vessel, thus establishing hovering flight for the rotorcraft that is stationary relative to the vessel.

In flight management systems, there exists a function for causing the rotorcraft to be positioned automatically in hovering flight vertically above a stationary target, such as a vessel that has stopped. From the coordinates of the stationary target, the FMS determines the approach path and the descent path along the axis of the wind so as to take up a hovering position automatically at a predefined distance from the target and facing the wind. The autopilot serves to follow those approach and descent paths, in particular to perform horizontal and vertical guidance of the rotorcraft and also to reduce its speed.

For example, Document U.S. Pat. No. 4,029,271 describes an automatic control system for a rotary wing aircraft in order to enable it to hover at a desired position and altitude, the desired position and altitude being known, stationary, and supplied by the pilot of the aircraft.

Also known is Document EP 0 141 575, which describes a device for assisting the piloting of a rotorcraft in order to locate an object, such as a ship or indeed a person in the sea requiring rescue, and to navigate to that object. That piloting assistance device serves in particular to define a path for approaching the object and for taking up a hovering position above the object.

The FMS can also include a function of tracking the progress of a mobile target after initially storing and making use of its position, its speed, and its route. That function serves to estimate a rendezvous point with the mobile target by taking account of the progress of the rotorcraft and to define a linking path for reaching the rendezvous point by providing lateral guidance only to the rotorcraft by means of the autopilot. Such a linking path may be referred to as a direct-to-hover approach.

By way of example, Document EP 0 141 575 describes a navigation system enabling a target to be reached, e.g. a person in the sea, and to hover above that target. The system uses a predetermined flight model having a path that begins by going away from the target with a tail wind and then going towards the target up wind, at preselected altitudes and at predetermined speeds.

Also known is Document US 2009/0157233, which describes a system and a method enabling a vehicle to track and provide surveillance of a target in autonomous manner. The system comprises a module for automatically recognizing a target so as to make it possible, on the basis of video information, to determine the characteristics of the target and its path. Thereafter, the system can deduce therefrom future characteristics of the target, and in particular a predicted path.

The final approach towards the mobile target, and in particular the descent path needs, then to be determined by the crew of the rotorcraft without specific assistance from the avionics on board in the rotorcraft, with this being done manually. This descent path should preferably follow the wake of the mobile target, i.e. it should lie in a vertical plane containing its route. As a result, the projections of the descent path and of the route of the mobile target onto a horizontal plane coincide. In aviation, a route is generally defined by its projection onto the ground, and thus onto a horizontal plane, so it can be considered that the descent path is equal to the route of the mobile target.

Nevertheless, the descent path may be influenced by wind conditions, i.e. wind direction and speed, that do not always enable the rotorcraft to follow the wake of the mobile target. Specifically, operating limitations of the rotorcraft, in particular relative to a strong tail wind or a strong cross wind to which the rotorcraft is subjected, make certain flight directions unavailable. The operating limitations of the rotorcraft therefore need to be taken into account in order to define the descent path of the rotorcraft.

Furthermore, the position, the route, and the speed of the mobile target that is to be reached are generally known to the crew of the rotorcraft when the operation is started or even at the time the rotorcraft takes off. However, variations in the position, the route, and the speed of the target while the rotorcraft is flying towards the target are not always known. Specifically, it is general practice to begin with a prior overflight over the mobile target in order to be sure that it is indeed the looked-for target. This overflight involves a non-negligible loss of time for the rescue operation and also reduces the range of the rotorcraft.

A rescue operation thus requires numerous parameters to be managed, relating both to the rotorcraft and to the weather, and also to the target to be rescued, thus making the mission complex with a high work load for the crew of the rotorcraft. A rescue operation on a mobile target, such as a mobile vessel, is more complex and more difficult to perform and puts a higher work load on the crew of the rotorcraft.

BRIEF SUMMARY OF THE INVENTION

Objects of the present invention are thus to provide a method and a system for establishing an approach path for a rotorcraft to a mobile target and for enabling the rotorcraft to hover relative to the mobile target, while avoiding the above-mentioned limitations. The present invention seeks in particular to determine automatically the characteristics of the approach path and of enabling the rotorcraft to hover relative to a mobile target and to do this automatically by means of the autopilot of the rotorcraft.

In the text below, the terms "first position", "first speed", and "first route", are used respectively for the position, the speed, and the route of a mobile target, and the terms "second position", "second speed", and "second route", are used respectively for the position, the speed, and the route of a rotorcraft, while the term "third speed" is used for the wind speed.

According to the invention, there is provided a method of establishing an approach to hover path for a rotorcraft enabling it to approach a mobile target and to hover relative to the target. Such a rotorcraft is provided with:
a flight management system FMS having at least one computer and at least one memory;
an acquisition device for acquiring a first position, a first speed, and a first route of a mobile target;
a locating device suitable for supplying a second position, a second speed, and a second route of the rotorcraft; and
a measurement device for measuring wind conditions in the proximity of the rotorcraft to measure a third speed and a direction of the wind to which the rotorcraft is subjected.

The method of the invention for establishing an approach path for a rotorcraft to a mobile target and for enabling the rotorcraft to hover relative to the target comprises the following stages:
a preliminary stage of establishing an initial approach to hover path for the rotorcraft relative to the target, the initial path being defined as an active path to be followed by the rotorcraft in order to reach the target;
a stage of establishing a required approach to hover path for the rotorcraft relative to the target as a function of possible variations of the characteristics of the target, of the rotorcraft, and of the wind to which the rotorcraft is subjected, the phase of establishing a required path being performed during the flight of the rotorcraft towards the target; and
a stage of updating the active path by the required path in order to guarantee safety for the active path.

The preliminary stage of establishing the initial path and the stage of establishing the required path both comprising in common manner the following steps:
a measurement step of measuring the characteristics of the target, of the rotorcraft, and of the wind to which the rotorcraft is subjected, and provided with the following substeps:
a first acquisition for acquiring the first position, the first speed and the first route of the target;
a second acquisition for acquiring the second position, the second speed, and the second route of the rotorcraft; and
a third acquisition for acquiring the third speed and the direction of the wind to which the rotorcraft is subjected; and
a step of establishing the characteristics of the approach to hover path for the rotorcraft relative to the target and provided with the following substeps:
a first determination for determining a predicted path for the target;
a second determination for determining a descent axis for the rotorcraft towards the target;
a third determination for determining a hovering point MRK for the rotorcraft relative to the target and a predicted interception position PTP for the rotorcraft intercepting the target, the hovering point MRK and the predicted interception point PTP being situated on the descent axis;
a fourth determination for determining a start-of-descent point TDN for the rotorcraft towards the target, the start-of-descent point TDN being situated on the descent axis passing via the hovering point MRK; and
a fifth determination for determining a transition point TP reachable by the rotorcraft and enabling the rotorcraft to join the start-of-descent point TDN.

It should be observed that a target, such as a vessel is considered as mobile when its travel speed is greater than or equal to a limit speed. By way of example, this limit speed may be equal to 2 knots (kt). It should be recalled that a speed of 1 kt corresponds to traveling a distance of one nautical mile (1 NM) in one hour, i.e. a speed of 1852 meters per hour (m/h).

It may also be observed that the term "route" is used to designate the direction followed by the rotorcraft. This direction may be characterized by an angle relative to a reference direction, generally north, and it is referred to as the "heading".

For simplification purposes, the term "hovering point MRK" is used to designate the hovering point MRK for the rotorcraft relative to the target.

The preliminary stage of establishing the initial path and the stage of establishing the required path make use of the same algorithms and use the same steps to determine respectively the initial path and the required path.

Initially, a step is performed of measuring the characteristics of the target, of the rotorcraft, and of the wind to which the rotorcraft is subjected.

The acquisition device serves to perform the first acquisition of the first position, of the first speed, and of the first route. The acquisition device may be a receiver known as an automatic identification system (AIS). An AIS receiver receives identification, position, speed, and estimated route information from AIS transmitters installed on certain ships. Such an automatic identification system is required on vessels exceeding a certain tonnage. Vessels detected by the AIS receiver of the rotorcraft are displayed on a display device of the rotorcraft, which may also display a chart of the zone.

The acquisition device may equally well be a distress signal receiver for receiving signals transmitted by distress beacons. Such a distress signal receiver receives identification, position, speed, and route information transmitted by distress beacons that are triggered by vessels in difficulty. For a rotorcraft, the distress signal receiver may be a "SATCOM" receiver associated with a family of telecommunications satellites in geostationary orbit. The distress signals detected by the distress signal receiver of the rotorcraft may also be displayed on a display device of the rotorcraft.

The acquisition device may also be a radar that detects vessels near to the rotorcraft together with their positions, their speeds, and their routes, which are then displayed on a display device in the form of respective points also know as a "radar echos".

With such acquisition devices, the looked-for target can be selected by manually inputting its identification or else directly on the display device. Direct selection may be performed on a touch sensitive display device or else by means of a cursor displayed on the display device and movable by means of a joystick or by any other selector means. These acquisition devices thus make it easy to identify and acquire the target and also determine capacities for tracking the movements of the selected target.

This first acquisition of the first position, of the first speed, and of the first route could also be performed manually by the crew of the rotorcraft directly on a computer on board the rotorcraft that is used as an acquisition device, e.g. a navigation computer.

The locating device serves to perform the second acquisition of the second position, of the second speed, and of the second route. By way of example, this locating device comprises a receiver of a satellite locating system given the general term global navigation satellite system (GNSS). The locating device may also have a radioaltimeter providing a current height of the rotorcraft above the ground or above the body of water situated under the rotorcraft.

The device for measuring wind conditions in the proximity of the rotorcraft serves to perform the third acquisition of the third speed and of the direction of the wind to which the rotorcraft is subjected. This measurement device generally makes use of the air speed measurement supplied by an airspeed indicator installed on the rotorcraft. This airspeed indicator may be a Pitot tube indicator as used conventionally in aviation or an ultrasound indicator, or indeed a laser measurement indicator. The third speed and the direction of the wind may be measured directly from a cross wind speed and from a longitudinal wind speed in the transverse and longitudinal directions respectively of the rotorcraft. This third speed may also be resolved after it has been acquired, as a function of the wind direction, so as to determine the speed of the cross wind and the speed of the longitudinal wind to which the rotorcraft is subjected. The longitudinal wind speed serves to define the speed of the tail wind to which the rotorcraft is subjected.

These acquisitions are preferably performed simultaneously, however they could nevertheless be performed sequentially.

The acquisition device, the locating device, and the measurement device are connected to the flight management system of the rotorcraft and can thus supply it continuously or at predetermined time intervals with the characteristics of the selected target, of the rotorcraft, and of the wind to which the rotorcraft is subjected.

Thereafter, the flight management system can establish the characteristics of the approach to hover path for enabling the rotorcraft to hover relative to the selected target. The step of establishing the characteristics of the approach to hover path enabling the rotorcraft to hover relative to the target is performed by a computer of the flight management system using algorithms stored in a memory of the flight management system.

Firstly, the first determination of a predicted path for the target can be performed. This predicted path is defined by the known characteristics of the mobile target, namely the first position, the first speed, and the first route. Under such circumstances, the predicted path is defined on the basis of the first position, along the first route, and assuming that the first speed is constant.

Thereafter, the second determination of a descent axis for the rotorcraft towards the target is performed. This descent axis is defined to be as close as possible to the first route, while taking account of the third speed and the direction of the wind to which the rotorcraft is subjected and also of the operating limitations of the rotorcraft relative to wind conditions.

Specifically, the preferred descent axis lies in the wake of the target and is equal to the first route of the target, i.e. it is situated in a vertical plane containing the first route. Nevertheless, the wind conditions and the operating limitations of the rotorcraft do not always make that possible. In particular, when the rotorcraft is subjected to a large cross wind or tail wind, it must not reach speeds of advance that are too small in order to avoid its speed relative to the air becoming too small, which would lead to a drop in the lift of its main rotor and possibly consequently to a crash of the rotorcraft. These operating limitations of the rotorcraft are known to the flight management system.

Consequently, in order to ensure that the rotorcraft remains in a safe flight envelope, the descent axis may be at an angle relative to the first route so that the conditions of the wind to which the rotorcraft is subjected are compatible with its operating limitations. This angle is defined in a horizontal plane as a function of the conditions of the wind to which the rotorcraft is subjected and of the operating limitations of the rotorcraft.

As a result, the descent axis of the rotorcraft towards the mobile target is defined to be along the wake of the target when the cross and tail wind speeds to which the rotorcraft is subjected are below fixed cross and tail wind thresholds. When the cross or tail wind speed is greater than or equal to the corresponding cross or tail wind thresholds, it is not possible for the rotorcraft to descend along a descent axis that is equal to the first route. The descent axis is then modified and defined in such a manner that the cross and tail wind speeds to which the rotorcraft is subjected do not exceed the respective cross and tail wind thresholds while the rotorcraft is descending. As a result, the rotorcraft is oriented closer to facing the wind. These cross and tail wind thresholds include a safety margin in order to accommodate potential gusts of wind.

The cross and tail wind thresholds are determined as a function of the operating limitations of the rotorcraft. These cross and tail wind thresholds may for example be equal respectively to 20 kt and to 5 kt.

The third determination for determining a hovering point MRK for the rotorcraft relative to the target and a predicted interception position PTP of the target by the rotorcraft is then performed. The point MRK and the position PTP are situated on the descent axis.

In addition, the hovering point MRK is determined so as to be situated at a safe distance from the predicted interception position PTP.

The safe distance may be a constant predetermined value. Preferably, the safe distance is equal to the sum of a constant intermediate distance plus a variable safety margin.

By way of example, the safety margin may be variable as a function of the first speed. The safety margin is typically supplied by a correspondence table based on the first speed. For example, the safety margin is equal to 0.1 NM for a target having a speed of 10 kt and to 0.2 NM for a target having a speed of 20 kt, the intermediate distance being equal to 0.1 NM. As a result, the safe distance adapts to the first speed and can vary in the same direction as the first speed, with the safe distance increasing when the first speed increases.

The safety margin may also be variable as a function of the integrity of the second position. This integrity is supplied by the locating device and is given in the form of the radius of the circle centered on the second position and containing the true position of the rotorcraft. This radius varies with the desired probability of having the true position of the rotorcraft. Specifically, smaller the radius is, greater the integrity of the position is, since the zone of uncertainty relating to the true position is small.

By way of example, the safety margin is equal to the greater value from this integrity value and a predetermined value corresponding to the first speed.

Furthermore, the hovering point MRK may be determined so that it is situated at a hovering height equal to the sum of a known height of the target plus a height margin. This known height of the target may for example be supplied by the acquisition device. By way of example, the height margin may have a predetermined value, typically equal to 50 feet (ft), where one foot is equal to 0.3048 meters (m).

This hovering height may also be defined as being equal to a predetermined constant value, e.g. equal to 100 ft. The hovering height may finally be defined as being the greater value from a predetermined constant value and a known height of the target plus the height margin.

The fourth determination for determining a start-of-descent point TDN for the rotorcraft towards the target is then performed. The start-of-descent point TDN is defined from the hovering point MRK and it is situated in a vertical plane containing the descent axis and passing through the point MRK.

Finally, the fifth determination for determining a transition point TP is performed on the basis of the start-of-descent point TDN. This transition point TP, which may also be referred to as a "turning" point, is defined as a function of the turning capacities of the rotorcraft and so as to enable the rotorcraft to join the start-of-descent point TDT and thus become aligned with the descent axis.

By way of example, these third, fourth, and fifth determinations may be performed by iterations in which the hovering point MRK is caused to vary from a point initially calculated on the basis of the first position to a point MRK situated on the descent axis and giving a rendezvous solution that is compatible with the flight capacities of the rotorcraft. By way of example, this solution corresponds to a flight time $T_{MRK}$ between the current position of the rotorcraft, i.e. the second position, and the point MRK which is the shortest so as to enable the rescue operation to take place as soon as possible.

More precisely, these third, fourth, and fifth determinations may be made up as follows:

a first predicted interception position $PTP_1$ is defined as the first position of the target;

on the basis of this first predicted interception position $PTP_1$, the descent axis and the hovering point MRK are calculated;

the start-of-descent point TDN is calculated;

the transition point TP is calculated, thus making it possible to define a complete approach path to the first predicted interception position $PTP_1$;

for this approach path, and knowing in particular the length of each branch between the characteristic points of this approach path and assuming the second speed of the rotorcraft in order to fly from the second position, i.e. the current position of the rotorcraft, to the point TDN and assuming a known deceleration of the rotorcraft between the points TDN and MRK, a flight time $T_{MRK}$ is calculated that is needed to fly from the second position to the point MRK;

on the basis of the first position of the target, a second predicted interception position $PTP_2$ is calculated by assuming that the target moves at the first speed along the first route during the flight time $T_{MRK}$;

an intermediate distance between the first predicted interception position $PTP_1$ and the second predicted interception position $PTP_2$ is calculated;

if the intermediate distance is less than or equal to a distance threshold, then the approach path is fixed with its determined characteristic points, i.e. the hovering point MRK, the start-of-descent point TDN, the transition point TP, and the predicted interception position PTP equal to the first predicted interception position $PTP_1$; and if this intermediate distance is greater than the distance threshold, the operations are re-iterated assuming that the first predicted interception position $PTP_1$ is equal to the second predicted interception position $PTP_2$.

By way of example, the threshold distance may be equal to 0.01 NM.

The step of measuring the characteristics of the target, of the rotorcraft, and of the wind to which the rotorcraft is subjected, comprise the first, second, and third acquisitions, and also the step of establishing the characteristics of the approach to hover path enabling the rotorcraft to hover relative to the selected target are all performed initially in order to determine an initial approach to hover path for enabling the rotorcraft to hover relative to the selected target. This preliminary stage of establishing an initial path is performed when triggering the rescue operation or else when the rotorcraft takes off. This initial path is then defined as an active path that the rotorcraft is to follow in order to reach the target and hover relative to the target.

The step of measuring the characteristics of the target, of the rotorcraft, and of the wind, and also the step of establishing the characteristics of the approach to hover path enabling the rotorcraft to hover relative to the target are also performed at regular intervals while the rotorcraft is flying towards the selected target in order to determine in real time a required approach to hover path for enabling the rotorcraft to hover relative to the target as a function of potential variations in the characteristics of the target, of the rotorcraft, and of the wind.

Finally, a stage of updating the active path by the required path is performed as a function of the differences between the active path and the required path, when necessary, in order to guarantee in particular that the operation takes place quickly and safely.

The active path is updated by the required path in order to modify the descent axis and/or the predicted path of the target, and also the predicted position PTP of the rotorcraft intercepting the target, and the hover point MRK, the transition point TP, and the start-of-descent point TDN.

Specifically, taking account of variations in the characteristics of the looked-for target, i.e. its first position, its first speed, and its first route, makes it possible to guarantee that the rotorcraft is directed effectively towards the looked-for target, with any change in the route or the speed of the target being taken into account. Under such circumstances, there is no longer any need for a prior overflight over the target prior to hovering relative thereto for the purpose of making sure that it is indeed the looked-for target.

A change in the first speed leads to a change in the hover point MRK and in the predicted interception position PTP, followed by a modification to the start-of-descent point TDN and the transition point TP.

In particular, as a result of the first speed being reduced, the hover point MRK is shifted along the descent axis in order to comply with the safe distance. An alert may optionally be provided to the crew of the rotorcraft in order to inform it about this shift of the point MRK.

A change in the first route of the target may lead to a modification to the descent axis and thus to a modification to the hover point MRK and to the predicted interception position PTP, followed by a modification to the start-of-descent point TDN and to the transition point TP.

In addition, taking account of variations in wind conditions, namely the third speed and the direction of the wind to which the rotorcraft is subjected, serves to ensure that the active path, and in particular the descent axis, is compatible with the operating limitations of the rotorcraft. Furthermore, these wind conditions are measured in the proximity of the rotorcraft, but they might be different in the vicinity of the target. Advantageously, taking account of variations in wind conditions in the proximity of the rotorcraft and thus while the rotorcraft is approaching the target, makes it possible to guarantee that, in the required path, account will be taken progressively of wind conditions present around the target as the rotorcraft approaches the target.

This taking account of such variations in wind conditions while approaching the target makes it possible to anticipate any change in the wind and thus to improve the safety of the rescue operation and thereby guarantee acceptable safety minimums during the approach and hovering stage, in particular concerning a safe distance between the target and the rotorcraft once it has reached the hover point MRK.

Furthermore, taking account of variations in the characteristics of the rotorcraft, namely its second position, its second speed, and its second route, makes it possible to correct for possible drift in the progress of the rotorcraft relative to the active path. These variations in the characteristics of the rotorcraft are obtained by means of the locating device, which acts automatically in real time to provide the flight management system with the current characteristics of the rotorcraft.

The stage of establishing a required path is performed at predetermined time intervals in order to guarantee that account is taken of any variation in the progress of the target and/or of the rotorcraft, and also of any variation in wind conditions. The stage of updating the active path by the required path is also performed, where necessary, at predetermined time intervals, which time intervals are preferably identical to the time intervals of the stage of establishing a required path.

For example, a predetermined time interval may be equal to 10 seconds, or else to one minute. The stage of establishing a required path and the stage of updating the active path with the required path may typically be performed once a minute until the rotorcraft reaches the transition point TP, and thereafter once every 10 seconds.

As a result, the method of the invention makes it possible to reduce the work load on the crew for determining the approach to hover path enabling the rotorcraft to hover relative to the looked—for mobile target and by updating the path, where necessary, as a function of variations in the characteristics of the target, of the rotorcraft, and of the wind.

Furthermore, the method of the invention advantageously makes it possible to reduce and optimize the time needed by the rotorcraft to reach the looked-for target, in particular by anticipating changes in the progress of the looked-for target and in wind conditions. Consequently, the chances of the operation being successful are increased. In addition, the operation is also performed in a manner that presents greater safety.

Furthermore, the method of the invention also makes it possible for the crew of the rotorcraft to modify and adjust manually the hover point MRK and the active path, in particular when the rotorcraft is situated close to the point MRK or indeed once the rotorcraft has reached the point MRK. In particular when the target is a ship of large tonnage, this possibility enables the point MRK to be positioned close to a particular point of the ship, e.g. as close as possible to the bow portion of the ship where the rescue operation is to be performed.

Nevertheless, it is possible in the context of the method of the invention to put restrictions into place concerning automatic updating of the active path by the required path.

For example, a range of angles may be defined in a horizontal plane about the initial descent axis as defined by the initial path. By way of example, this range of angles may be defined prior to the rescue operation, or indeed while establishing the initial path.

In this context, the descent axis of the active path is updated automatically by the required descent axis as defined by the required path providing the required descent axis lies within this range of angles about the initial descent axis.

Otherwise, i.e. when the required descent axis lies outside the predetermined range of angles about the initial descent axis, as defined in a horizontal plane, the descent axis of the active path is not updated automatically with the required descent axis, but only after it has been validated by a crew member of the aircraft. By way of example, such a validation action may comprise pressing on a pushbutton or selecting an icon on a screen. An audible and/or visual alert may be triggered in order to inform the crew of the rotorcraft that the required descent axis lies outside the range of angles and that updating of the active path needs to be validated. By way of example, the range of angles may cover an angle of 20° equally distributed on either side of the initial descent axis.

In addition, when the rotorcraft is situated close to one of the characteristic points of the active path, the active path may be "frozen" in order to avoid continuing updating the active path and in order to allow the operation to be performed quickly. Specifically, it can be considered that when the rotorcraft is situated in the proximity of a characteristic point of the active path, wind conditions are not going to vary much and consequently the descent axis can be "frozen". Only the speed and the route of the target might possibly vary in significant manner. This characteristic point of the active path is preferably the transition point TP.

The term "freeze" is used of the active path to mean that the characteristics of the active path are kept constant. These characteristics of the active path are no longer updated automatically with the characteristics of the required path.

It is considered that the rotorcraft is situated in the proximity of a characteristic point of the active path when the rotorcraft is situated at a distance from that point that is less than or equal to a proximity threshold. The proximity threshold may be a previously defined distance. The proximity threshold may also be equal to the distance traveled by the rotorcraft at the second speed for a predefined duration. This possibility serves advantageously to take account of the second speed when determining the proximity threshold. By way of example, this predefined duration may be one minute.

Nevertheless, exceptions to "freezing" these characteristics of the active path may be taken into account by the method of the invention for safety reasons. These exceptions relate in particular to complying with the safe distance between the hover point MRK and the predicted interception position PTP as a result of changes to the speed and/or the route of the target.

For example, if the distance between the hover point MRK of the active path, now "frozen", and the predicted interception position PTP of the required path is less than the safe distance, then the point MRK of the active path is updated with the point MRK of the required path in order to comply with the safe distance.

In another example, with the safe distance being equal to the sum of a constant intermediate distance plus a variable safety margin, so long as the distance between the point MRK of the active path and the predicted interception position PTP of the required path lies between the safe distance and the constant intermediate distance, the point MRK remains "frozen" and is not updated, with the safety margin being consumed in part or in full, while the constant intermediate distance is used to guarantee safety of the rescue operation.

In contrast, if the distance between the hover point MRK of the active path and the predicted interception position PTP of the required path is less than the constant intermediate distance, then the point MRK of the active path can be updated automatically with the point MRK of the required path in order to comply with a new safe distance equal to the constant intermediate distance.

Nevertheless, in both situations, an alert may be issued to the crew as soon as the safe distance is no longer complied with. The point MRK of the active path may also be updated by the point MRK of the required path as a result of a validation action by the crew of the rotorcraft.

The crew of the rotorcraft may also adjust the hover point MRK manually in order to move it away from the predicted interception position PTP after the alert has been issued.

The method of the invention for establishing an approach path to a mobile target may also include a stage of displaying at least certain characteristics of the active path on a display device.

For example, the first position, which is the current position of the target, the predicted position PTP of the target, the second position, which is the current position of the rotorcraft, the transition point TP, the start-of-descent point TDN, and the hover point MRK may be displayed. The crew of the rotorcraft, and in particular the pilot, can thus visualize the progress of the target and the predicted interception position PTP and also the transition points TP, the start-of-descent point TDN, and the hover point MRK.

Nevertheless, in order to limit the amount of information that is displayed, the predicted position PTP of the target and the hover point MRK may be displayed only when the rotorcraft is situated at a display distance from one of the characteristic points of the active path, or indeed has reached one of these characteristic points. The other characteristic points of the active path may be displayed from the beginning of the rescue operation.

For example, the display distance may correspond to a distance traveled by the rotorcraft over a duration of three minutes. The predicted position PTP of the target and the hover point MRK can thus be displayed as soon as the aircraft reaches the start-of-descent point TDN or lies within three minutes of reaching the hover point MRK.

The pilot can thus cause the rotorcraft to follow the active path while complying with these waypoints until the rotorcraft is hovering relative to the target at the point MRK.

The rotorcraft may also include an autopilot. The autopilot is linked to the flight management system and thus enables the rotorcraft to follow automatically the previously defined active path to the point MRK.

This active path then comprises an approach path to the transition point TP, a linking path to the start-of-descent point TDN, and a descent path to the hover point MRK where the rotorcraft hovers relative to the target. The autopilot also makes it possible to manage the decelerations of the rotorcraft, and in particular to match the second speed of the rotorcraft to the first speed of the target when the rotorcraft reaches the point MRK. For this purpose, the flight management system communicates with the autopilot firstly to provide it with flight setpoints and secondly to control and correct the progress of the rotorcraft relative to those setpoints.

The approach path between the current position of the rotorcraft and the transition point TP may for example be a substantially rectilinear path of "direct to hover" type. The linking path between the transition point TP and the start-of-descent point TDN serves to bring the rotorcraft into alignment with the descent axis. The descent path to the hover point MRK makes it possible at the hover point MRK to have a second speed and a second route that are equal to the first speed and the first route.

The approach path is preferably followed essentially at the maximum speed of the rotorcraft in order for the rescue operations to take place as quickly as possible. The approach path may also take place essentially at a speed leading to the rotorcraft having the greatest possible flying autonomy time.

A first deceleration of the rotorcraft may take place before the transition point TP, should that be necessary, so that the second speed is compatible with the linking path between the transition point TP and the start-of-descent point TDN.

Thereafter, the rotorcraft performs a second deceleration on the descent path so that it reaches the hover point MRK where it has a second speed equal to the first speed of the target.

As a result, the present invention also provides a method of assisting in enabling a rotorcraft to approach a mobile target and to hover relative to the target, during which method the active path established by the above-described method of establishing an approach to hover path enabling a rotorcraft to hover relative to a mobile target is followed automatically by the rotorcraft.

The present invention also provides a system for establishing an approach to hover path enabling a rotorcraft to hover relative to a mobile target. The system serves to perform the above-described method. For this purpose, the system comprises:

a flight management system having at least one computer and at least one memory;

an acquisition device for acquiring a first position, a first speed, and a first route of the mobile target;

a device for locating the rotorcraft serving to supply a second position, a second speed, and a second route of the rotorcraft; and a device for measuring wind conditions in the proximity of the rotorcraft, and specifically a third speed and a direction of the wind to which the rotorcraft is subjected.

The system for establishing an approach path to a mobile target may also include a display device or may make use of a display device of the rotorcraft. Furthermore, the system may communicate with an autopilot of the rotorcraft via the flight management system.

BRIEF DESCRIPTION OF THE DRAWINGS

The invention and its advantages appear in greater detail from the context of the following description of implementations given by way of illustration and with reference to the accompanying figures, in which.

Elements present in more than one of the figures are given the same references in each of them.

DETAILED DESCRIPTION OF THE INVENTION

Figure 1:
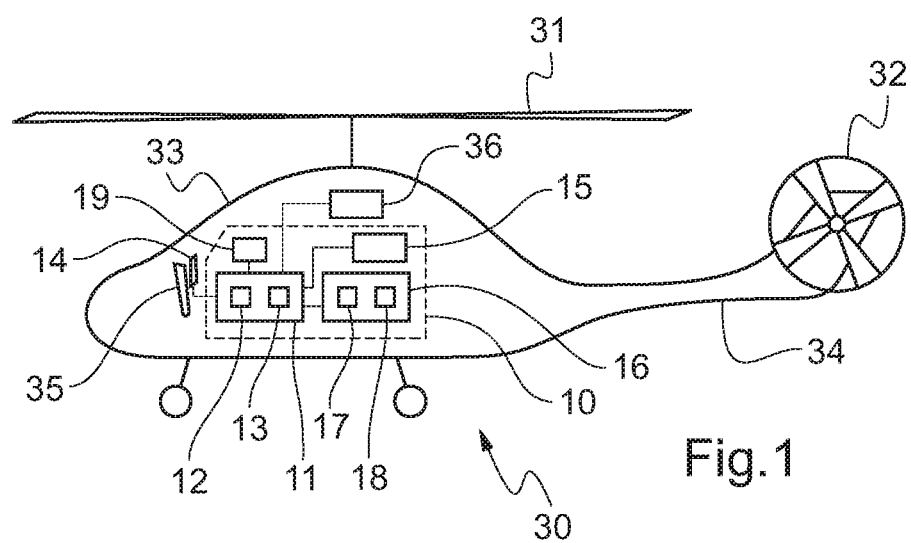
FIG. 1 shows a rotorcraft fitted with a system for establishing an approach to hover path for the rotorcraft relative to the mobile target.

FIG. 1 shows a rotorcraft 30 comprising a main rotor 31 positioned above a fuselage 33 and an anti-torque tail rotor 32 positioned at the rear end of a tail boom 34. The rotorcraft 30 also has an autopilot 36 and an instrument panel 35 with at least one display device 14 such as a screen. The rotorcraft 30 is particularly intended for search and rescue operations at sea, and for this purpose it includes a system 10 for establishing an approach to hover path for the rotorcraft 30 to a mobile target 20, and enabling the rotorcraft 30 to hover relative to the target 20.

The system 10 includes a flight management system 11 having a computer 12 and a memory 13, an acquisition device 15 for acquiring characteristics relating to a looked-for target 20, a locating device 16 for locating the rotorcraft 30, and a measurement device 19 for measuring wind conditions in the proximity of the rotorcraft 30. The acquisition device 15, the locating device 16, and the measurement device 19 are connected to the flight management system 11.

Figure 2:
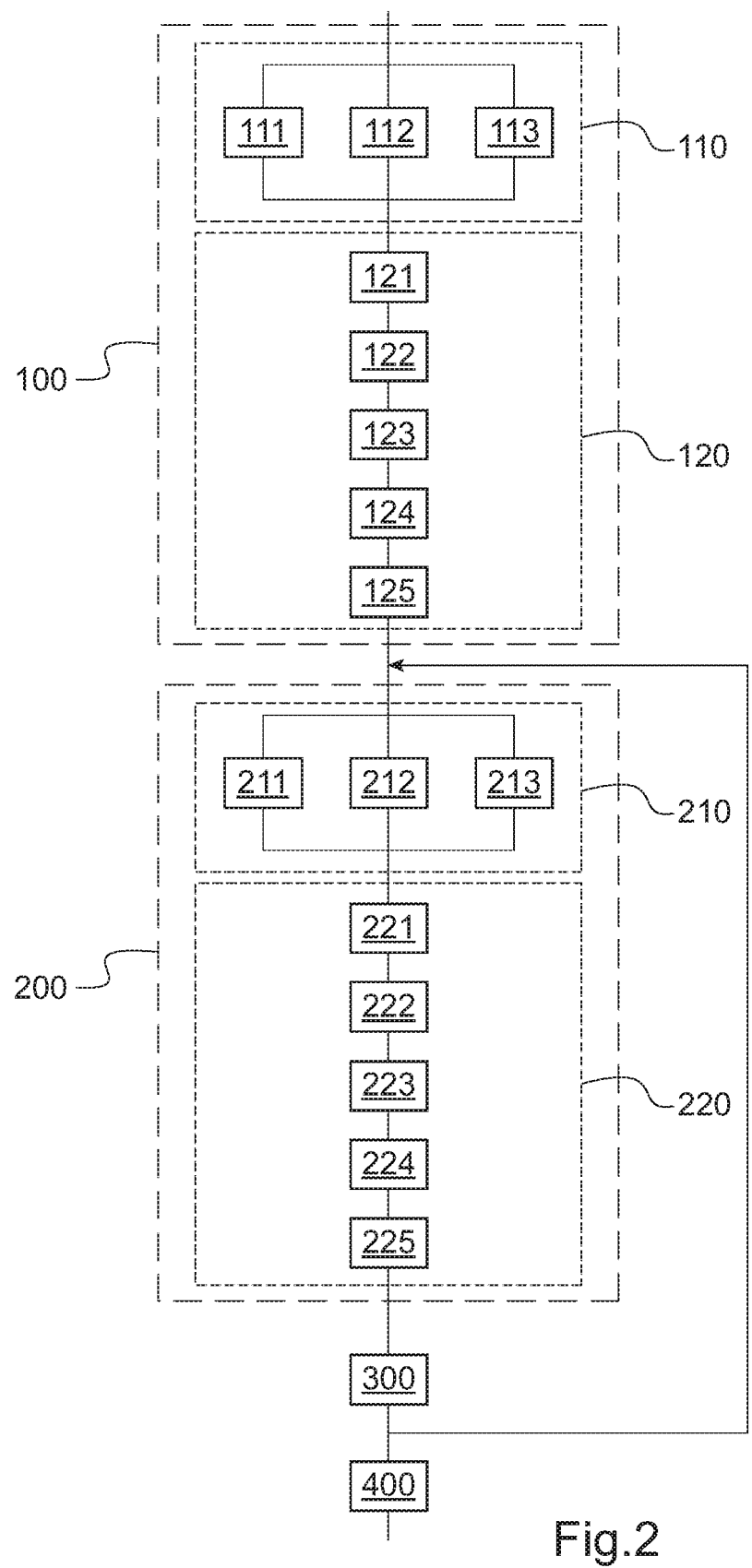
FIG. 2 is a summary diagram of a method of establishing an approach to hover path for the rotorcraft relative to the mobile target.

The system 10 implements a method of establishing an approach to hover path for the rotorcraft 30 to a mobile target 20 and enabling the rotorcraft 30 to hover relative to the target 20, with a summary diagram of the method being shown in FIG. 2.

The method comprises in particular a preliminary stage 100 of establishing an initial approach to hover path for the rotorcraft 30 relative to the target 20, a stage 200 of establishing a required approach to hover path for the rotorcraft 30 relative to the target 20 as a function of possible variations in the characteristics of the target 20, of the rotorcraft 30, and of the wind to which the rotorcraft 30 is subjected, and a stage 300 of updating the active path by the required path in order to guarantee safety for the active path.

When beginning the rescue operation, the initial path is defined as an active path that is to be followed by the rotorcraft 30 in order to reach the target 20. Thereafter, while the rotorcraft 30 is flying towards the target 20, the stage 200 of establishing a required path is performed, and then the active path is updated by the required path during the stage 300 of updating the active path by the required path where necessary as a function of variations in the characteristics of the target 20, of the rotorcraft 30, and of the wind to which the rotorcraft 30 is subjected.

The preliminary stage 100 of establishing the initial path and the stage 200 of establishing the required path comprise the same steps that are performed respectively before starting the operation and while the rotorcraft 30 is flying towards the target 20.

Initially, a measurement step 110, 210 of measuring the characteristics of the target 20, of the rotorcraft 30, and of the wind to which the rotorcraft 30 is subjected is performed during which the system 10 acquires input data transmitted to the flight management system 11.

Figure 4:
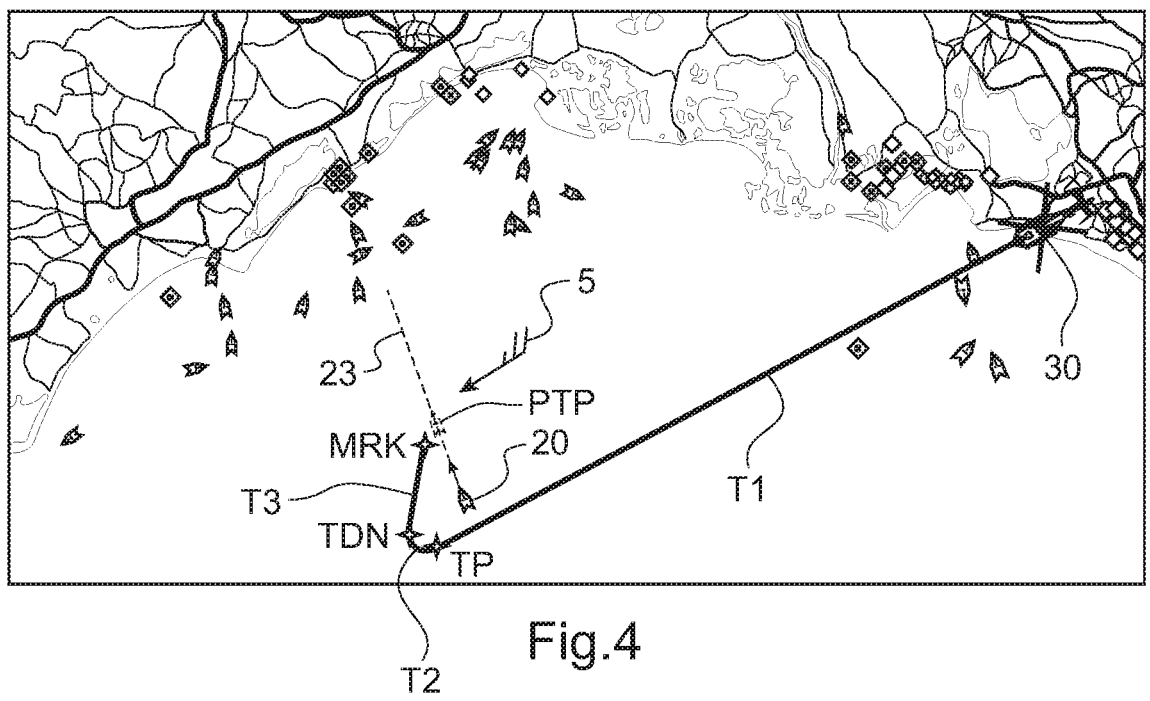
FIG. 4 is a view of a display of the system for establishing an approach path to the mobile target.

The acquisition device 15 is an AIS receiver enabling vessels fitted with the AIS automatic identification system and sailing in a zone around the rotorcraft 30 to be identified automatically, and also enabling characteristics relating to those vessels to be received, i.e. their positions, their speeds, and their routes. The AIS receiver is connected to the screen 14. The screen can then display the vessels that have been detected in the environment of the rotorcraft 30 together with the outline of the coast, as shown in FIG. 4. A target 20 that is to be rescued by the rotorcraft 30 can then be selected directly on the screen 14, if it is touch screen, or else by using a joystick. During a first acquisition 111, 211, the acquisition device 15 then supplies the flight management system 11 with a first position, a first speed, and a first route of the selected target 20.

The locating device 16 includes a GNSS receiver 17 of a satellite locating system that acts during a second acquisition 112, 212 to supply the flight management system 11 with a second position, a second speed, and a second route of the rotorcraft 30, and a radioaltimeter 18 supplies a current height of the rotorcraft 30 relative to the ground or the body of water situated under the rotorcraft 30.

Furthermore, the measurement device 19 for measuring wind conditions in the proximity of the rotorcraft 30 is an airspeed indicator serving, during a third acquisition 113, 213, to measure a third speed and a direction for the wind to which the rotorcraft 30 is subjected and to supply them to the flight management system 11.

A stage 120, 220 of establishing characteristics of an approach to hover path for the rotorcraft 30 relative to the target is then performed by the system 10, and in particular by the computer 12 of the flight management system 11 by using instructions stored in the memory 13, e.g. in the form of algorithms.

Figure 5:
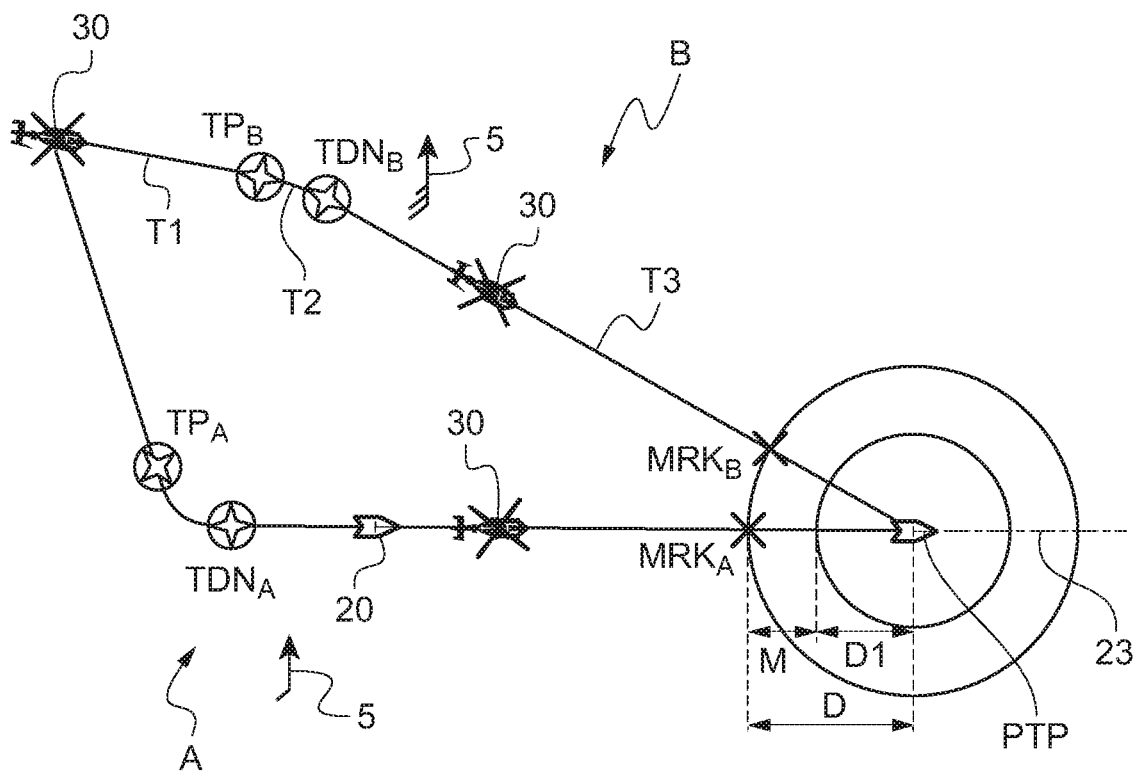
FIG. 5 is a diagram showing various different approach paths to the target depending on the wind to which the rotorcraft is subjected.

A predicted path 23 is initially determined for the target 20 during a first determination 121, 221. The predicted path 23 is determined on the basis of the first position, the first speed, and the first route. Thereafter, a descent axis is determined for the rotorcraft 30 towards the target 20 during a second determination 122, 222. Two possibilities for this descent axis are shown in FIG. 5, depending on the direction and the third speed of the wind to which the rotorcraft 30 is subjected. In FIG. 5, there can be seen in particular, projected onto a horizontal plane $P_0$ formed by the ground or by the water surface over which the rotorcraft 30 is flying, the predicted path 23 and a predicted position PTP for the rotorcraft 30 intercepting the target 20, together with the descent axis, a transition point TP, a start of descent point TDN, and a hovering point MRK relating to these various possibilities. An indication 5 of wind direction and speed is also shown for each possibility.

After the second determination 122, 222 of the descent axis, the hovering point MRK for the rotorcraft 30 relative to the target 20 and a predicted interception position PTP for the rotorcraft 30 intercepting the target 20 are determined during a third determination 123, 223. The hovering point MRK and the predicted interception position PTP are situated on the descent axis. The point MRK is determined so as to be situated firstly at a safe distance D from the predicted position PTP of the target 20 in a horizontal plane, and secondly at a hovering height L2.

As shown in FIG. 5, the safe distance D may be equal to the sum of a constant intermediate distance D1 plus a variable safety margin M. The safety margin M is variable depending on the first speed and/or on the integrity of the second position.

Figure 6:
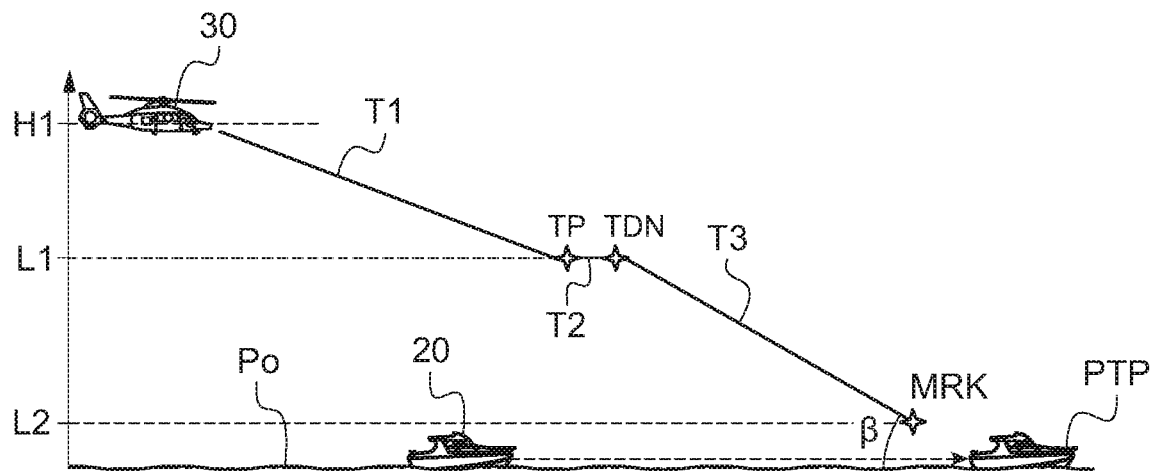
FIGS. 6 and 7 are two vertical profiles of approach paths to the target.
Figure 7:
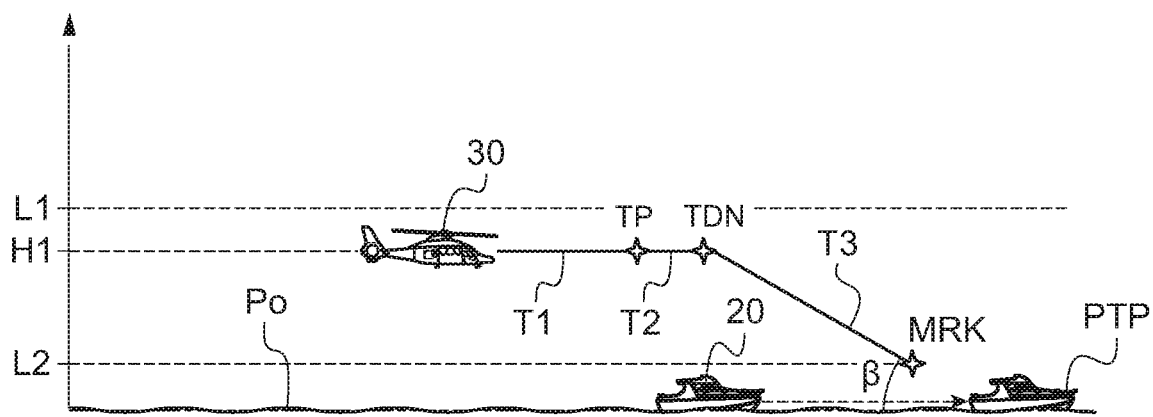

Thereafter, during a fourth determination 124, 224, the start point TDN for the descent of the rotorcraft 30 towards the target 20 is defined on the basis of the point MRK by means of a descent angle β and a start-of-descent height relative to the horizontal plane $P_0$, as shown in FIGS. 6 and 7. The start-of-descent point TDN is situated in a vertical plane containing the descent axis and the point MRK.

The descent angle β is preferably a constant value defined before the rescue operation. By default, the start-of-descent height may be equal to an altitude threshold L1 defined before the rescue operation, as shown in FIG. 6. This altitude threshold L1 may for example be 1000 ft.

Nevertheless, if the rotorcraft 30 is situated at a flying height H1 lower than the altitude threshold L1, as shown in FIG. 7, the start-of-descent point TDN is determined so that the start-of-descent height is equal to the height of flight H1. The rotorcraft 30 then performs level flight until it reaches the transition point TP.

Finally, the transition point TP is defined during the fifth determination 125, 225 from the start-of-descent point TDN and as a function of the turning capabilities of the rotorcraft.

The transition point TP is preferably determined so as to be situated at the same altitude as the start-of-descent point TDN, i.e. at the start-of-descent height.

The second determination 122, 222 for determining the descent axis takes account of the operating limitations of the rotorcraft 30 depending on the cross wind or tail wind to which it is subjected. These operating limitations of the rotorcraft 30 are known, in particular to the flight management system 11, and they are characterized in particular by a cross wind threshold and by a tail wind threshold which may be equal respectively to 20 kt and 5 kt, for example. Under such circumstances, the second determination 122, 222 of determining the descent axis takes these operating limitations of the rotorcraft 30 into account as well as the first route of the target 20, the third speed of the wind, and the direction of the wind.

In a first possibility A shown in FIG. 5, the descent axis is equal to the first route. The first target point $TDN_A$ and the first hovering point $MRK_A$ are then situated on the predicted path 23. The first possibility A corresponds to the rotorcraft 30 being subjected to little wind, the third speed being less than 20 kt, and being in a direction that is perpendicular to the first route. The first transition point $TP_A$ is defined between the current position of the rotorcraft 30 and the first descent point $TDN_A$.

In a second possibility B, the descent axis is at an angle relative to the first route. The second start-of-descent point $TDN_B$ and the second hovering point $MRK_B$ are defined off the predicted path 23. The second possibility corresponds to the rotorcraft 30 being subjected to a wind that is relatively strong, e.g. the third speed may be greater than 20 kt and in a direction perpendicular to the first route. The second transition point $TP_B$ is defined between the current position of the rotorcraft 30 and the second start-of-descent point $TDN_B$. The angle between the descent axis and the predicted path 23 is defined as a function of the third speed and of the wind direction such that the cross wind speed and the tail wind speed to which the rotorcraft 30 is subjected do not exceed the cross wind and tail wind thresholds respectively while the rotorcraft 30 is descending.

Complying with these cross and tail wind thresholds makes it possible to approach the target 20 in safe manner while taking account of the first route of the target 20 and also the third speed and the direction of the wind to which the rotorcraft 30 is subjected.

Figure 3:
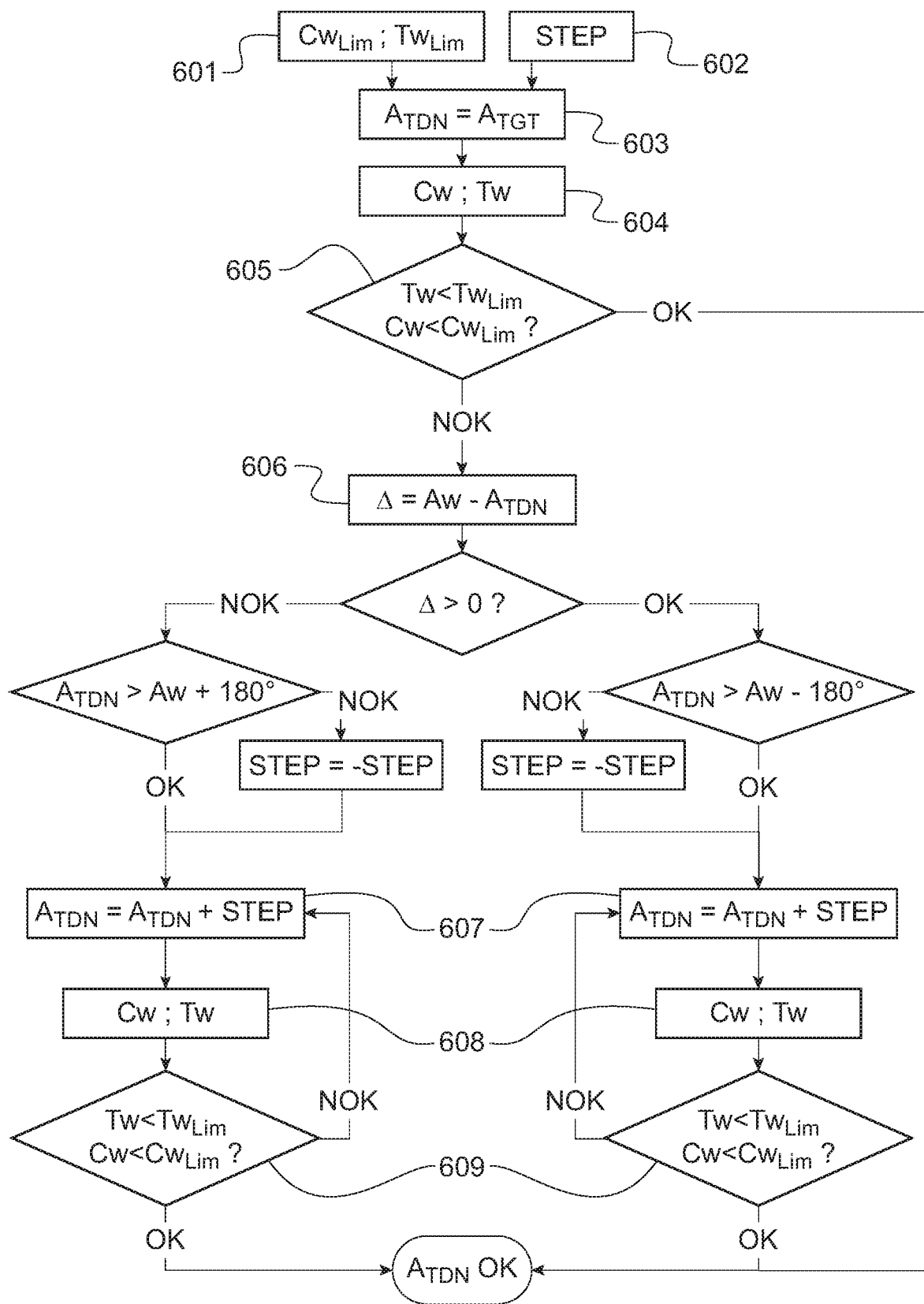
FIG. 3 is a flow chart for determining a descent axis for the rotorcraft going towards the target.

The second determination 122, 222 for determining the descent axis may also be performed iteratively starting from a descent axis equal to the first route and increasing towards the direction of the wind to which the rotorcraft 30 is subjected. The descent axis is validated as soon as the rotorcraft 30 is subjected to a cross wind at a speed less than the cross wind threshold and to a tail wind at a speed less than the tail wind threshold. The descent axis and the first route are characterized by their respective headings. A diagram summarizing this second determination 122, 222 for determining the descent axis in iterative manner is shown in FIG. 3. This second determination 122, 222 comprises the following substeps:

determining 601 a cross wind threshold $Cw_{Lim}$ and a tail wind threshold $Tw_{Lim}$ as a function of the operating limitations of the rotorcraft 30;

determining 602 an iteration step size STEP, e.g. equal to 1°;

determining 603 the descent axis equal to the first route of the target 20 and situated in a vertical plane containing the first route, the descent axis being characterized by a descent heading $A_{TDN}$ and the first route of the target 20 by a target heading $A_{TGT}$; calculating 604 a cross wind speed Cw and a tail wind speed Tw to which the rotorcraft 30 would be subjected if the rotorcraft 30 were flying along the descent axis;

comparing 605 the cross wind speed Cw with the cross wind threshold $Cw_{Lim}$ and the tail wind speed Tw with the tail wind threshold $Tw_{Lim}$:

if the cross wind speed Cw is less than the cross wind threshold $Cw_{Lim}$ and if the tail wind speed Tw is less than the tail wind threshold $Tw_{Lim}$, the descent axis is validated;

if the cross wind speed Cw is not less than the cross wind threshold $Cw_{Lim}$ or indeed if the tail wind speed Tw is not less than the tail wind threshold $TW_{Lim}$, the following substeps are performed:

calculating 606 a wind angle Δ between a direction Ax of the wind to which the rotorcraft 30 is subjected and the descent axis;

if the wind angle Δ is a positive angle and if the descent heading $A_{TDN}$ is greater than a heading formed by the direction Aw of the wind to which the rotorcraft is subjected minus a flat angle of 180°, the sign of the iteration step size STEP is inverted, i.e. the value "1" is replaced by the value "−1" or the value "−1" is replaced by the value "1";

if the wind angle Δ is a negative angle and if the descent heading $A_{TDN}$ is greater than a heading formed by the direction Ax of the wind to which the rotorcraft is subjected plus a flat angle of 180°, the sign of the iteration step size is inverted;

an iteration 607 of the descent axis while adding an iteration step size STEP to the descent heading $A_{TDN}$;

calculating 608 the cross wind speed Cw and the tail wind speed Tw to which the rotorcraft would be subjected if the rotorcraft were flying along the previously defined descent axis;

comparing 609 the cross wind speed Cw with the cross wind threshold $Cw_{Lim}$ and the tail wind speed Tw with the tail wind threshold $Tw_{Lim}$;

if the cross wind speed Cw is less than the cross wind threshold $Cw_{Lim}$ and if the tail wind speed Tw is less than the tail wind threshold $Tw_{Lim}$, the descent axis is validated; and if the cross wind speed Cw is not less than the cross wind threshold $Cw_{Lim}$, or indeed if the tail wind speed Tw is not less than the tail wind $Tw_{Lim}$, the second determination 122, 222 returns to descent axis iteration 607.

The wind angle Δ between the direction Ax of the wind to which the rotorcraft 30 is subjected and the descent axis is defined in a horizontal plane. This wind angle Δ is defined more precisely between a projection of the wind direction Ax onto the horizontal plane and a projection of the descent axis onto the horizontal plane.

After the stage 200 of establishing the required path, the active path may be updated by the required path during the updating stage 300, where necessary, as a function of variations in the characteristics of the target 20, of the rotorcraft 30, and of the wind to which the rotorcraft 30 is subjected.

As a result, a change of the first route and/or of the first speed is taken into account earlier, thus avoiding a loss of time in searching for the target 20 and performing the rescue operation. Likewise, any drift in the progress of the rotorcraft 30 can also be corrected and any change in wind conditions can be taken into account so as to optimize the response time of the rotorcraft 30 while guaranteeing that the operation is safe.

The active path can then be followed by the rotorcraft 30 as follows:

an approach stage of approaching the target 20 along an approach path T1 between a current position of the rotorcraft 30 and the transition point TP;

an alignment stage of aligning the rotorcraft 30 with the descent axis along a linking path T2 between the current position of the rotorcraft 30 and the start-of-descent point TDN;

a descent stage of descending towards the target 20 along a descent path T3 parallel to the descent axis between the current position of the rotorcraft 30 and the hovering point MRK; and a hovering stage of the rotorcraft 30 hovering relative to the mobile target 20 at the point MRK.

These various stages of the active path may be followed automatically by the autopilot 36 of the rotorcraft 30. These various stages of the active path may equally well be followed manually by the pilot of the rotorcraft 30 complying with the transition point TP, the start-of-descent point TDN, and the hovering point MRK, and also the descent axis until the rotorcraft 30 is hovering relative to the target 20.

Furthermore, the method of the invention may include a display stage 400 of displaying the transition point TP, the start-of-descent point TDN, and the hovering point MRK on the display device 14, as shown in FIG. 4. The current positions of the target 20 and of the rotorcraft 30, together with the indication 5 showing the direction and the third speed of the wind are also displayed.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of establishing an approach to hover path for a rotorcraft enabling the rotorcraft to approach a moving target and to hover relative to the moving target, the rotorcraft being subjected to wind and being provided with:

a flight management system having at least one computer and at least one memory;

an acquisition device for acquiring a position, a speed, and a route of the moving target;

a locating device suitable for supplying a position, a speed, and a route of the rotorcraft; and a measurement device for measuring wind conditions in the proximity of the rotorcraft to measure a speed of the wind to which the rotorcraft is subjected and a direction of the wind to which the rotorcraft is subjected;

wherein the method comprises:

a preliminary stage of establishing an initial approach to hover path for the rotorcraft towards a hovering relative to the moving target, the initial approach to hover path being defined as an active path to be followed by the rotorcraft in order to reach the moving target;

a stage of establishing a required approach to hover path for the rotorcraft towards a hovering relative to the moving target as a function of variations, during flight of the rotorcraft towards the moving target, of characteristics of the moving target, of the rotorcraft, and of the wind to which the rotorcraft is subjected, the stage of establishing the required approach to hover path being performed after the preliminary stage of establishing the initial approach to hover path and during the flight of the rotorcraft along the active path towards the moving target; and a stage of updating the active path by the required approach to hover path as a function of differences between characteristics of the active path and of the required approach to hover path in order to guarantee safety for the active path;

the preliminary stage of establishing the initial approach to hover path and the stage of establishing the required approach to hover path both comprising in common manner the following steps:

a measurement step of measuring the characteristics of the moving target, of the rotorcraft, and of the wind to which the rotorcraft is subjected, and provided with the following substeps:
  a first acquisition, using at least the acquisition device, for acquiring the position, the speed, and the route of the moving target;
  a second acquisition, using at least the locating device, for acquiring the position, the speed, and the route of the rotorcraft; and
  a third acquisition, using at least the measurement device, for acquiring the speed and the direction of the wind to which the rotorcraft is subjected; and a step of establishing the characteristics of the approach to hover path for the rotorcraft relative to the moving target, using at least the flight management system, and provided with the following substeps:
  a first determination for determining a predicted path for the moving target;
  a second determination for determining a descent axis for the rotorcraft towards the moving target, the descent axis being a projection of a descent path onto a horizontal plane formed by a surface on which the moving target is located, the descent axis being defined to be as close as possible to the route of the moving target so that an angle of the descent axis relative to the predicted path is close as possible to being a zero angle, taking account of the speed of the wind to which the rotorcraft is subjected and the direction of the wind to which the rotorcraft is subjected and also of operating limitations of the rotorcraft;
  a third determination for determining a hovering point for the rotorcraft relative to the moving target and a predicted interception position for the rotorcraft intercepting the moving target, the hovering point and the predicted interception point being situated in a vertical plane containing the descent axis;
  a fourth determination for determining a start-of-descent point for the rotorcraft towards the moving target, the start-of-descent point being situated in the vertical plane containing the descent axis passing via the hovering point; and
  a fifth determination for determining a transition point reachable by the rotorcraft and enabling the rotorcraft to join the start-of-descent point; and
wherein the stage of updating the active path by the required approach to hover path includes modifying the descent axis for the rotorcraft towards the moving target as a function of the differences between
  (i-a) the route of the moving target of the active path and (i-b) the route of the moving target of the required approach to hover path,
  (ii-a) the speed of the wind to which the rotorcraft is subjected of the active path and (ii-b) the speed of the wind to which the rotorcraft is subjected of the required approach to hover path, and
  (iii-a) the direction of the wind to which the rotorcraft is subjected of the active path and (iii-b) the direction of the wind to which the rotorcraft is subjected of the required approach to hover path.

2. The method according to claim 1, wherein the approach to hover path for the rotorcraft relative to the moving target is defined in such a manner that a safe distance lies between the hovering point and the predicted interception position for intercepting the moving target, the safe distance being equal to the sum of a constant intermediate distance plus a safety margin that is variable as a function of the characteristics of the moving target, of the rotorcraft, or of the wind to which the rotorcraft is subjected.

3. The method according to claim 2, wherein the safety margin is variable as a function of the speed of the moving target.

4. The method according to claim 2, wherein during the second acquisition, an integrity is supplied for the position of the rotorcraft, and the safety margin is equal to the integrity.

5. The method according to claim 1, wherein a cross wind threshold and a tail wind threshold are determined as a function of the operating limitations of the rotorcraft, and then:
  due to the speed of the wind to which the rotorcraft is subjected being less than the cross wind threshold and the tail wind threshold, the descent axis is defined as being equal to the route of the moving target and in a vertical plane containing the route of the moving target.

6. The method according to claim 1, wherein the second determination of determining the descent axis comprises the following substeps:
  determining a cross wind threshold and a tail wind threshold as a function of the operating limitations of the rotorcraft;
  determining an iteration step size STEP;
  determining the descent axis equal to the route of the moving target and situated in a vertical plane containing the route, the descent axis being characterized by a descent heading;
  calculating a cross wind speed and a tail wind speed to which the rotorcraft would be subjected if the rotorcraft were flying along the descent axis;
  comparing the cross wind speed with the cross wind threshold and the tail wind speed with the tail wind threshold:
  if the cross wind speed is less than the cross wind threshold and the tail wind speed is less than the tail wind threshold, the descent axis is validated;
  if the cross wind speed is not less than the cross wind threshold or indeed if the tail wind speed is not less than the tail wind threshold, the following substeps are performed:
    calculating a wind angle between a direction of the wind to which the rotorcraft is subjected and the descent axis;
    if the wind angle is a positive angle and the descent heading is greater than a heading formed by the direction minus a flat angle of 180°, the sign of the iteration step size STEP is inverted;
    if the wind angle is a negative angle and the descent heading is greater than a heading formed by the direction plus a flat angle of 180°, the sign of the iteration step size is inverted;
    an iteration of the descent axis while adding an iteration step size STEP to the descent heading;

calculating the cross wind speed and the tail wind speed to which the rotorcraft would be subjected if the rotorcraft were flying along the descent axis;

comparing the cross wind speed with the cross wind threshold and the tail wind speed with the tail wind threshold;

if the cross wind speed is less than the cross wind threshold and the tail wind speed is less than the tail wind threshold, the descent axis is validated; and if the cross wind speed is not less than the cross wind threshold, or indeed if the tail wind speed is not less than the tail wind, the second determination returns to descent axis iteration.

7. The method according to claim 1, wherein the descent axis of the active path is updated automatically by a required descent axis defined by the required path if the required descent axis lies within a predetermined range of angles about an initial descent axis defined by the initial approach to hover path.

8. The method according to claim 7, wherein the descent axis of the active path is updated by the required descent axis as a result of an action of a crew member of the rotorcraft if the required descent axis is situated outside the predetermined range of angles about the initial descent axis.

9. The method according to claim 1, wherein the third, fourth, and fifth determinations are made up as follows:

defining a first predicted interception position equal to the position of the moving target;

from the first predicted interception position, calculating the descent axis, the hovering point, and the start-of-descent point;

calculating the transition point, thus making it possible to define a complete approach path to the first predicted interception position;

knowing the length of each branch of the approach path and considering the speed of the rotorcraft for flying from the position of the rotorcraft to the point, and knowing the deceleration of the rotorcraft between the points, calculating a flight time needed to fly from the position of the rotorcraft to the point;

on the basis of the position of the moving target calculating a second predicted interception position assuming that the moving target is moving at the speed of the moving target along the route of the moving target during the flight time;

calculating an intermediate distance between the first predicted interception position and the second predicted interception position;

if the intermediate distance is less than or equal to a distance threshold, then the approach path is fixed with the hovering point, the start-of-descent point, the transition point, and the predicted interception position equal to the first predicted interception position; and if the intermediate distance is greater than the distance threshold, re-iterating the third determination assuming that the first predicted interception position is equal to the second predicted interception position.

10. The method according to claim 1, wherein the hovering point for the rotorcraft relative to the moving target is determined so as to be situated at a height equal to the sum of a known height of the moving target plus a safety margin.

11. The method according to claim 1, wherein the active path is fixed when the rotorcraft is situated at a distance from one of the characteristic points of the active path that is less than or equal to a proximity threshold.

12. The method according to claim 11, wherein if the distance between the predicted interception point of the required path and the hovering point of the active path is less than the safe distance, the hovering point of the active path is updated with the hovering point of the required path in order to comply with the safe distance.

13. The method according to claim 11, wherein the safe distance is equal to the sum of a constant intermediate distance plus a variable safety margin, and if the distance between the predicted interception position of the required path and the hovering point of the active path is less than the constant intermediate distance, the hovering point of the active path is updated with the hovering point of the required path in order to comply with a safe distance equal to the constant intermediate distance.

14. The method according to claim 1, wherein the method includes a display stage of displaying the predicted position of the moving target on a display screen when the rotorcraft is situated at a display distance from a characteristic point of the active path.

15. A method of assisting an approach of a rotorcraft to a moving target and of enabling the rotorcraft to hover relative to the moving target, the rotorcraft being provided with:

a flight management system having at least one computer and at least one memory;

an acquisition device for acquiring a position, a speed, and a route of the moving target;

a locating device enabling a position, a speed, and a route to be supplied of the rotorcraft;

a measurement device for measuring wind conditions in the proximity of the rotorcraft in order to measure a speed and a direction of wind to which the rotorcraft is subjected; and an autopilot;

wherein the active path established by the method of establishing an approach to hover path for a rotorcraft enabling it to approach a moving target and to hover relative to the target according to claim 1 is performed automatically by the autopilot.

16. A system for establishing an approach to hover path of a rotorcraft on a moving target and for causing the rotorcraft to hover relative to the moving target, the system comprising:

a flight management system having at least one computer and at least one memory;

an acquisition device for acquiring a position, a speed, and a route of the moving target;

a locating device enabling a position, a speed, and a route to be supplied of the rotorcraft; and a measurement device for measuring wind conditions in the proximity of the rotorcraft in order to measure a speed and a direction of wind to which the rotorcraft is subjected;

wherein the system implements the method according to claim 1.

17. The method according to claim 1, wherein a tail wind threshold is determined as a function of the operating limitations of the rotorcraft, and then:

due to the speed of the wind to which the rotorcraft is subjected being greater than or equal to the tail wind threshold, the descent axis is defined to be as close as possible to the route of the moving target and in such a manner that the rotorcraft is subjected to a tail wind that is less than the tail wind threshold.

18. The method according to claim 1, wherein a cross wind threshold is determined as a function of the operating limitations of the rotorcraft, and then:

due to the speed of the wind to which the rotorcraft is subjected being greater than or equal to the cross wind threshold, the descent axis is defined to be as close as possible to the route of the moving target and in such a manner that the rotorcraft is subjected to a cross wind that is less than the cross wind threshold.

19. The method according to claim 1, wherein the stage of establishing a required approach to hover path is performed at regular intervals during the flight of the rotorcraft towards the moving target and the stage of updating the active path by the required approach occurs at regular intervals, wherein all of the regular intervals occur more rapidly once the rotorcraft reaches the transition point.

20. The method according to claim 1, wherein characteristic points of the active path include the hovering point, the predicted interception, the point start-of-descent point, and the transition point, and when the rotorcraft is situated close to one of the characteristic points of the active path the active path may be frozen and not updated to thereby avoid continuing updating the active path whereby operation may be performed quicker.

\* \* \* \* \*